(12) United States Patent
Hopper

(10) Patent No.: US 8,738,966 B2
(45) Date of Patent: May 27, 2014

(54) CHANGE MANAGEMENT SYSTEM AND METHOD

(75) Inventor: Robin Hopper, Prague (CZ)

(73) Assignee: CA, Inc., Islandia, NY (US)

( * ) Notice: Subject to any disclaimer, the term of this patent is extended or adjusted under 35 U.S.C. 154(b) by 295 days.

(21) Appl. No.: 13/276,653

(22) Filed: Oct. 19, 2011

(65) Prior Publication Data

US 2013/0103990 A1 Apr. 25, 2013

(51) Int. Cl.
G06F 11/00 (2006.01)

(52) U.S. Cl.
USPC .............................. 714/25; 714/26; 714/38.1

(58) Field of Classification Search
CPC ............................. G06F 11/1433; G06F 8/65
USPC .................................................. 714/25, 26
See application file for complete search history.

(56) References Cited

U.S. PATENT DOCUMENTS

| | | | |
|---|---|---|---|
| 5,253,184 A * | 10/1993 | Kleinschnitz | 702/184 |
| 7,237,023 B2 * | 6/2007 | Menard et al. | 709/224 |
| 7,379,846 B1 * | 5/2008 | Williams et al. | 702/185 |
| 7,680,753 B2 * | 3/2010 | Sudhindra et al. | 706/45 |
| 7,730,020 B2 * | 6/2010 | Leung et al. | 707/600 |
| 2007/0067678 A1 * | 3/2007 | Hosek et al. | 714/25 |
| 2007/0100712 A1 | 5/2007 | Kilpatrick et al. | |
| 2007/0288795 A1 * | 12/2007 | Leung et al. | 714/26 |
| 2008/0022274 A1 | 1/2008 | Shieh | |
| 2009/0089776 A1 | 4/2009 | Sonkin et al. | |
| 2010/0023933 A1 | 1/2010 | Bryant et al. | |

* cited by examiner

Primary Examiner — Charles Ehne
(74) Attorney, Agent, or Firm — Myers Bigel Sibley & Sajovec, P.A.

(57) ABSTRACT

A method is provided for managing changes to a computer system. The method includes generating a database configured with fields identifying one or more component changes and potential problems associated with each one or more component changes; populating the fields of the database with information as a change is made to a computer system; monitoring the computer system for issuance of error alerts; comparing issued error alerts against entries of potential problems in the database; and identifying a set of at least one of the component changes as a potential cause of the issued error alert based on the result of the comparing step. The method executes a corrective process in response to the identification of the potential cause of the issued error and updates the database entry of the set of at least one of the component changes to reflect the issued error as a confirmed error thereof.

14 Claims, 3 Drawing Sheets

CHANGE MANAGEMENT SYSTEM AND METHOD

FIELD OF THE INVENTION

The present invention relates generally to change management systems, and more specifically the present invention relates to a system and method for matching reported errors with recent software changes.

BACKGROUND OF THE DISCLOSURE

Commercial computer systems require many interdependent software programs in order to perform useful functions. These software programs include an operating system, various hardware drivers, and one or more applications. Current software programs often rely on external software components, known as shared libraries, dynamic-linked libraries, shared objects, or plug-ins, which are self-contained sets of related routines that can be accessed by software programs in order to provide functionality.

Often, the software components, collectively referred to hereinafter as shared libraries, are used by multiple software programs. This sharing of resources increases overall efficiency and performance since the computer system does not need to store many programs having overlapping functionality, and the shared libraries can be loaded and executed only when needed.

Similarly, operating systems rely on hardware drivers and helper applications to perform many of the basic functions of the operating system, including accessing network interface cards (NICs), human interface devices (e.g., keyboards, mice, touch pads, etc.), and display screens.

A benefit to the modular design of current software is the ability to periodically upgrade one portion of the software program without requiring a complete reinstallation of the software program. With respect to reinstalling an operating system, several hours may be required for the process. Such periodic upgrades can be initiated in an effort to correct software bugs, newly identified security flaws, and implement new features. As a result, bugs and security flaws can be corrected within days of a problem being identified.

However, along with the above benefits, the modularity of modern software programs also present certain disadvantages, the most significant being incompatibility with particular versions of shared libraries or drivers. These incompatibilities can lead to instability of the software program (i.e., crashes) at a minimum, and often can lead to the software program failing to execute at all.

Because a modern computer system has many software programs using a multitude of shared libraries, drivers and helper applications of one type or another, most of which remain hidden to the general computer user, it is often difficult to identify which of these components may be causing an error.

SUMMARY OF THE DISCLOSURE

An embodiment of the present invention includes the steps of generating a database configured with fields identifying one or more component changes and potential problems associated with each one or more component changes; populating the fields of the database with information as a component change is made to a computer system; monitoring the computer system for issuance of error alerts; comparing issued error alerts against entries of potential problems in the database; and identifying a set of at least one of the component changes as a potential cause of the issued error alert based on the result of the comparing step. The component changes entered into the database include changes to hardware, security privileges, software components, database entries, and settings changes.

Additionally, an embodiment of the present invention executes a corrective process in response to the identification of the potential cause of the issued error.

Moreover, an embodiment of the present invention includes an iterative process for identifying a minimum number of component changes from the set of at least one of the component changes as a confirmed cause of the issued error.

Further, an embodiment of the present invention updates the database entry of potential problems associated with each of the minimum number of component changes to reflect the issued error as a confirmed error thereof.

BRIEF DESCRIPTION OF THE DRAWINGS

These and other features, aspects, and advantages of the present invention will become better understood with regard to the following description, appended claims, and accompanying drawings wherein:

DETAILED DESCRIPTION OF DISCLOSURE

Figure 1:
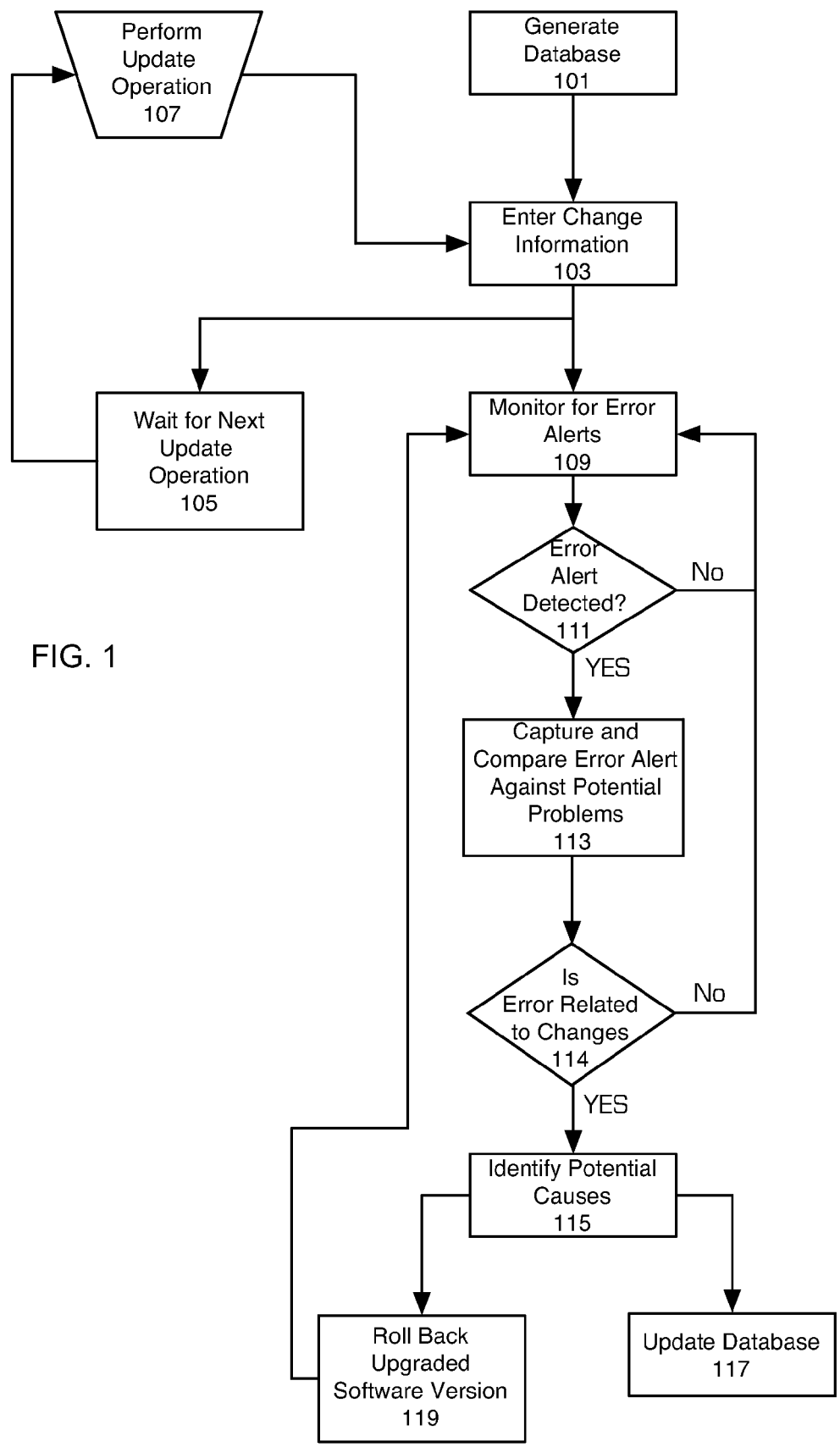
FIG. 1 illustrates a flow diagram of the process for performing an embodiment of the present invention.

Referring to FIG. 1, an embodiment of the present invention initiates by creating a database, in step 101, configured to store change information regarding software installations, updates and other changes to the computer system environment. For example, the database may be configured with records having fields for: name of upgraded software entity, version number, release date, dependencies, potential problems, and previously installed version number. The potential problem field may contain information, provided by the maintainer of the software entity (e.g., programmer or manufacturer), of known or suspected bugs or security flaws. Alternatively, the information contained in the potential problems field may be derived based on the functions provided by the software entity. For example, a shared library that provides Zettabyte filesystem (more commonly known as ZFS) functionality can be assumed to cause potential problems relating to read/write errors and volume access.

Once the database is generated, the database is populated with the change information for the software installed on the monitored computer system in step 103. The present embodiment then proceeds to step 105 where the process waits for the next instance of a software upgrade or installation. When a software change, such as an upgrade, occurs in step 107, the present embodiment executes step 103 again.

At the same time that the present embodiment executes step 105, the present embodiment also monitors the computer system in step 109 for error alerts, or software crashes. If an error alert is detected in step 111, the present embodiment captures the error alert information, such as the text of the error alert, error code, application or service that generated the error alert, etc., in step 113. Additionally, in step 113, the captured error alert information is compared against the potential problems entries in the database. Based on the comparison conducted in step 113, the present embodiment determines if the error alert is related to a change recorded in the database in step 114. If the error alert is not related to a recorded change, the present embodiment returns to step 109 and continues monitoring for new error alerts.

Error alerts that are determined to not be related to recorded changes in step 114 are handled by the operating system in the conventional manner. The conventional error handling may include presentation of an error alert message to the user of the computer system, etc.

However, if the error alert is determined to relate to a recorded change, the present embodiment identifies one or more software entities as the potential cause of the error alert in step 115.

Additionally, in step 115, the present embodiment can be configured to provide notification to the user of the computer system that the error alert has been captured and corrective action is being taken. Further, step 115 of the present embodiment can be configured to provide the user with details relating to the cause of the error alert and the corrective action being performed. Furthermore, step 115 of the present embodiment can be configured to provide the user with an option to either have the change management system of the present embodiment perform the corrective action or abort the corrective action.

The list of one or more software entities identified as potential causes of the error alert is used by the present embodiment to update the database in step 117, to identify the error corresponding to the error alert as a known problem of the one or more software entities identified as potential causes of the error alert. Additionally, the present embodiment performs a corrective process in step 119 that includes rolling back (i.e., down-grading) the one or more software entities identified as potential causes to previously installed stable versions where possible, or quarantining or removing of the one or more software entities identified as potential causes where roll back is not feasible. Once the corrective process 119 is completed, the present embodiment returns to step 109 to continue monitoring the computer system for future error alerts.

Figure 2:
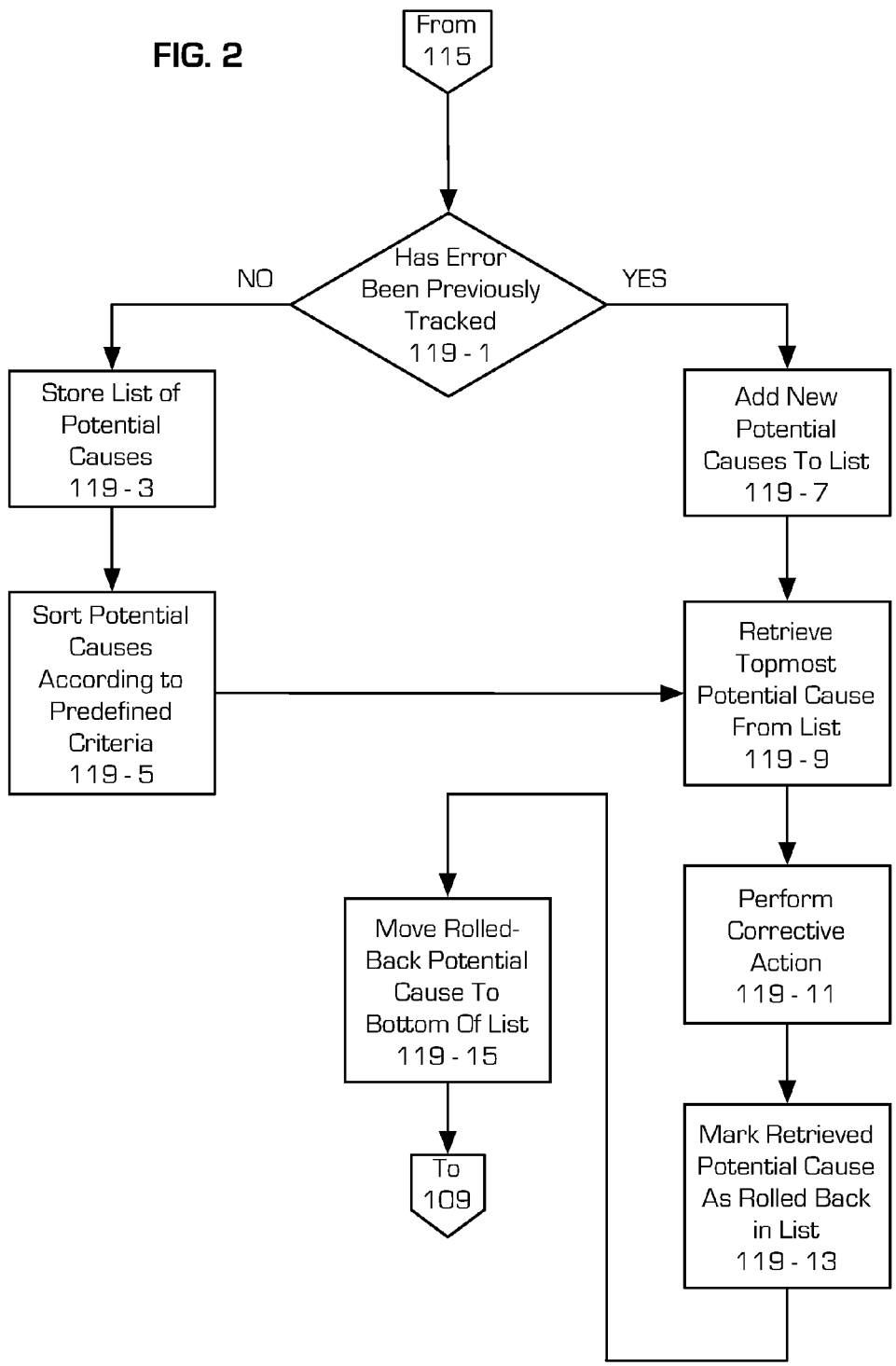
FIG. 2 illustrates a flow diagram of the process for performing an iterative roll back process in accordance with an embodiment of the present invention.

The corrective process of step 119 can be configured to operate on all the software entities identified as potential causes of the error alert all at once. Alternatively, the corrective process of step 119 can be configured to provide an iterative process—an example of which is shown in FIG. 2 and discussed in detail below—to eliminate one or more of the identified software entities as potential causes so that only the minimum number of identified software entities are rolled back or removed. This iterative process identifies the software entity, of the software entities identified as potential causes, having the highest probability of causing the error alert, and rolling back only this one software entity. The process then returns to step 109 and continues monitoring the computer system for new error alerts.

It is noted that herein "roll back" is intended to encompass actual down-grading of a software change as well as any other corrective action performed in an effort to avoid future occurrences of the error alert.

If subsequent error alerts are detected in step 111 that are identical to the previous error alert, the present embodiment will roll back the next highest priority software entity on the list of potential causes in step 119. The previously, rolled back software entity will then be flagged as not the cause of the error alert, and thus allowed to be returned to its upgraded version once again. This iterative process can be repeated until the error alert in question is no longer detected. Once the error alert is no longer detected in step 111, the most recent software entity that was rolled back in connection with the error alert by step 119 is marked as the known cause of the error alert. By marking the software entity as the known, or confirmed, cause of the error alert, the software entity is prevented from being upgraded to the error-causing version in the future.

In another embodiment of the present invention, the change management is not limited to software changes. The present embodiment is configured to operate on all change categories to a computer system, including changes to databases, security privileges (e.g., user accounts), hardware (e.g., storage devices, memory, peripheral devices, etc.), configuration settings for, e.g., network services, printing, and display.

Turning to FIG. 2, a detailed flow diagram of an iterative process performed at step 119 of the above-described embodiment is shown. Initially, the process begins once potential causes of the error are identified in Step 115. In step 119-1, the iterative roll back process checks if the error has previously occurred, and thus tracked by the system. If the error has not previously been tracked by the system, the process proceeds to step 119-3 where the potential causes of the error are stored in a list designated for the specific error. Additionally, the list of potential causes is sorted into a hierarchal order, in step 119-5, based on a sorting criteria, such as alphabetical, length of time that each potential cause has been operating on the computer system (i.e. most recently changed first), probability of being the cause of the error, etc. Once the list of potential causes has been created and sorted, the process proceeds to step 119-9, discussed below.

Referring back to step 119-1, if the error has been previously tracked, and thus a list of potential causes, has already been created, the process moves to step 119-7 where any new potential causes of the error identified in step 115 are added to the list at the proper hierarchal position. The process then proceeds to step 119-9.

In step 119-9 the topmost potential cause, as listed, of the error is retrieved. Depending on the type of element referenced by the retrieved potential cause—i.e. software component, security privilege, database entry, or hardware component—an appropriate corrective action is performed at step 119-11. After performing the corrective action, the retrieved potential causes is marked in the list as having been rolled back, in step 119-13. The now-marked potential cause is moved to the bottom of the list in step 119-15. At this point the iterative roll back process terminates by returning to step 109 of FIG. 1.

Subsequent occurrences of the error will cause the iterative roll back process to proceed directly from step 119-1 to step 119-7, and in step 119-9 the process will retrieve the new topmost potential cause of the error in the list.

Figure 3:
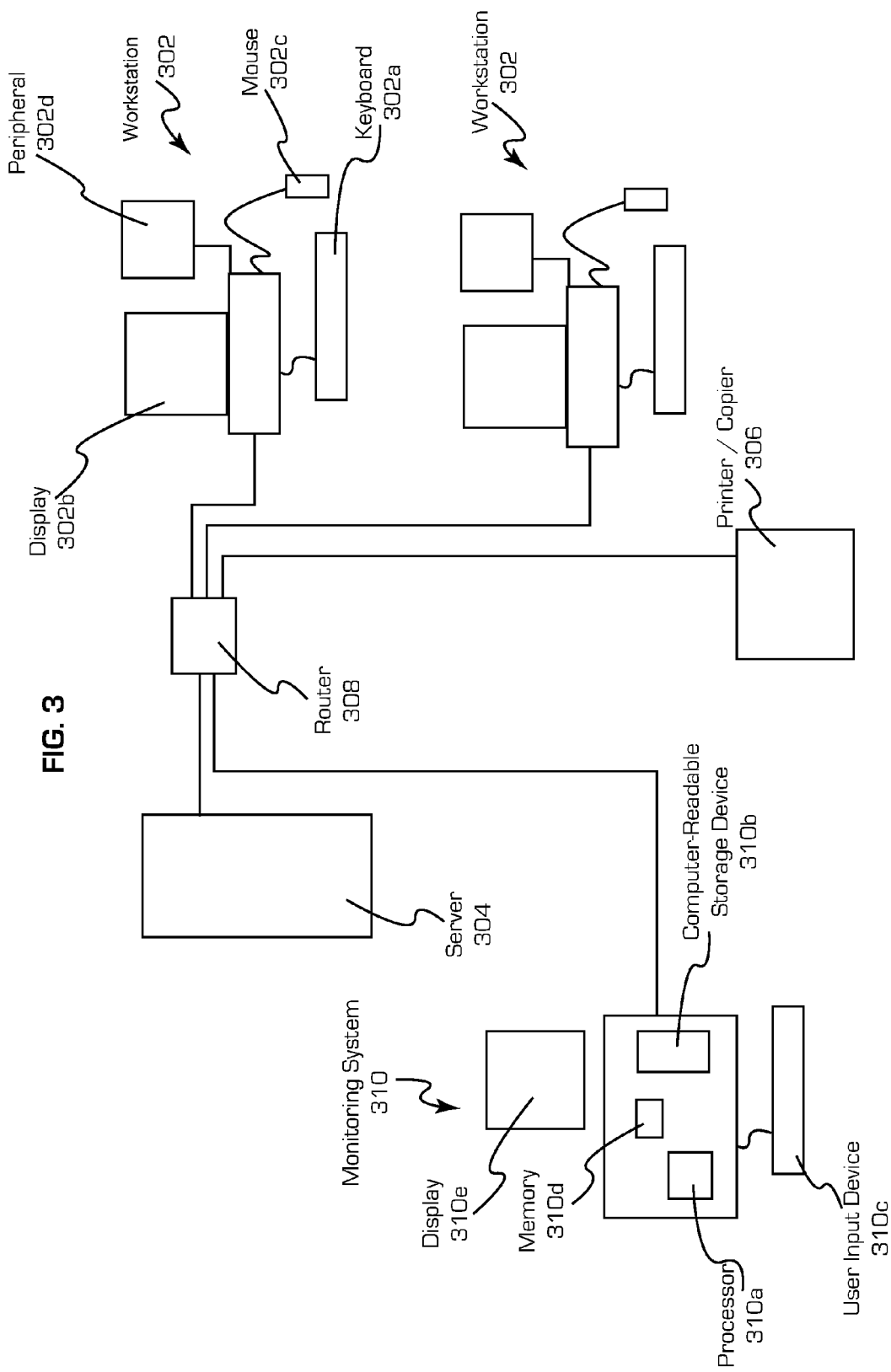
FIG. 3 illustrates a block representation of a system employing an embodiment of the present invention.

The present invention can be utilized in any computer system deployment, for example the present invention is applicable for both small home office settings as well as large scale enterprise environments having fully staffed IT departments. FIG. 3 provides a block representation of an environment in which the present invention can be used. The environment shown in FIG. 3 includes a number of workstations 302, each having a keyboard 302a, display 302b, mouse 302c, and other peripherals 302d. Additionally, as understood in the art, the workstations 302 include computer-readable storage devices, such as hard drives, optical drives, and solid-state memory (e.g., Solid-state Drives, Multimedia Cards, Flash cards, etc.), a processor, and one or more read-only and random access memory modules.

Additionally, a server 304 and one or more printers/copiers 306 are present. The server 304, workstations 302 and printer/copiers 306 are connected to one another by way of a router 308 utilizing any one or more communication protocols such as IEEE 802.11a/b/g/n wireless protocols, IEEE 802.3 Ethernet protocols, token ring, or other standard or proprietary communication protocols. For simplicity, the embodiment in FIG. 3 is shown with a wired network. However, multiple networks may be utilized at the same time, as well.

Also connected to the network, and in communication with all the other systems on the network, is a monitoring system 310. In the present embodiment the monitoring system is essentially a specialized workstation 302 having the necessary software programs installed thereon to perform the functions disclosed above with respect to the embodiments of FIGS. 1 and 2. The monitoring system 310 includes at least one processor 310a configured to execute the software programs which are stored on a computer-readable storage device 310b. Additionally, the monitoring system has one or more user input devices 310c (e.g., keyboard, mouse, trackpad, etc.), memory 310d and a display 310e.

In an alternative embodiment, the software programs for performing the functions of the present invention may be installed on the server 304 (or on a second server, not shown) and executed remotely by the monitoring system 310. Additionally, the database which stores the change information can be provided either on a computer-readable storage device disposed on the server 304 or the computer-readable storage device 310b of the monitoring system 310.

An embodiment of the present invention is intended to operate from a computer operations center configured to monitor a large number of individual computer systems and terminals for error alerts. Operators viewing display screens receive notifications of error alerts issued by the monitored computer systems. The system of the present embodiment immediately flags error alerts that match changes recorded in the database and notifies the operator that corrective action is being taken by the system.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A method for managing software updates to a computer system comprising:
    generating a database configured with fields identifying a plurality of software updates and potential problems associated with the software updates;
    populating the fields of the database with information responsive to a software update being made to the computer system;
    monitoring the computer system for issuance of error alerts;
    comparing issued error alerts against entries of potential problems in the database;
    identifying a set of at least one of the software updates as a potential cause of an issued error alert in response to the comparing; and
    rolling back the set of at least one of the software updates that was identified as the potential cause of the error alert, to a previously installed version thereof.

2. The method as in claim 1, further comprising updating the database entry of potential problems associated with each of a minimum number of software updates to reflect the issued error alert as a confirmed error thereof.

3. The method as in claim 1, wherein the identifying comprises iteratively identifying a minimum number of software updates from the set of at least one of the software updates as a confirmed cause of the issued error.

4. The method as in claim 3, wherein the rolling back comprises rolling back one of the set of at least one of the software updates to a previously installed version thereof, and monitoring for a subsequent occurrence of the issued error alert.

5. The method as in claim 4, wherein if the subsequent occurrence of the issued error alert is detected, a next one of the set of at least one of the software updates is rolled back to a previously installed version thereof.

6. The method as in claim 5, wherein the iteratively identifying comprises rolling back each of the set of at least one of the software updates until the subsequent occurrence of the issued error alert ceases, and identifying a last replaced software update of the set of at least one of the software updates as a confirmed cause.

7. The method as in claim 1, further comprising identifying the potential problem corresponding to the issued error alert as a confirmed problem of the set of at least one of the software updates.

8. A computer program comprising:
    a tangible computer-readable storage medium comprising computer-readable program code embodied in the medium that when executed by at least one processor of a computer system causes the computer system to perform operations comprising:
    generating a database configured with fields identifying a plurality of software updates and potential problems associated with the software updates;
    populating the fields of the database with information responsive to a software update being made to a computer system;
    monitoring the computer system for issuance of error alerts;
    comparing issued error alerts against entries of potential problems in the database;
    identifying a set of at least one of the software updates as a potential cause of an issued error alert in response to the comparing; and
    rolling back the set of at least one of the software updates that was identified as the potential cause of the error alert, to a previously installed version thereof.

9. The computer program as in claim 8, further comprising updating the database entry of potential problems associated with each of the minimum number of software update to reflect the issued error alert as a confirmed error thereof.

10. The computer program as in claim 8, wherein the identifying comprises iteratively identifying a minimum number of software updates from the set of at least one of the software updates as a confirmed cause of the issued error.

11. The computer program as in claim 10, wherein the rolling back comprises rolling back one of the set of at least one of the software updates to a previously installed version thereof, and monitoring for a subsequent occurrence of the issued error alert.

12. The computer program as in claim 10, wherein if the subsequent occurrence of the issued error alert is detected, a next one of the set of at least one of the software updates is rolled back to a previously installed version thereof.

13. The computer program as in claim 11, wherein the iteratively identifying comprises rolling back each of the set of at least one of the software updates until the subsequent occurrence of the issued error alert ceases, and identifying a last replaced software update of the set of at least one of the software updates as a confirmed cause.

14. The computer program as in claim 8, further comprising identifying the potential problem corresponding to the issued error alerts as a confirmed problem of the set of at least one of the software updates.

* * * * *